(12) United States Patent
Brokaski

(10) Patent No.: US 7,013,835 B2
(45) Date of Patent: Mar. 21, 2006

(54) CAT LITTER DEVICE

(76) Inventor: David Brokaski, 392 S. Marengo Ave. #107, Pasadena, CA (US) 91101

( * ) Notice: Subject to any disclaimer, the term of this patent is extended or adjusted under 35 U.S.C. 154(b) by 104 days.

(21) Appl. No.: 10/833,668

(22) Filed: Apr. 27, 2004

(65) Prior Publication Data

US 2005/0235920 A1   Oct. 27, 2005

(51) Int. Cl.
*A01K 29/00* (2006.01)
(52) U.S. Cl. .................................. 119/166
(58) Field of Classification Search ............... 119/161, 119/165, 166, 168; 209/260, 235, 283, 288, 209/417, 418, 419, 420
See application file for complete search history.

(56) References Cited

U.S. PATENT DOCUMENTS

| | | |
|---|---|---|
| 1,268,450 A | 6/1918 | Gauntt |
| 4,120,264 A | 10/1978 | Carter |
| 4,465,018 A | 8/1984 | Mopper |
| 4,493,288 A | 1/1985 | van der Kolk |
| 4,522,150 A | 6/1985 | Gershman |
| 4,846,104 A | 7/1989 | Pierson, Jr. |
| 4,886,014 A | 12/1989 | Sheriff |
| 5,048,464 A | 9/1991 | Shirley |
| 5,107,797 A | 4/1992 | LaRoche |
| 5,167,204 A | 12/1992 | Nussle |
| 5,178,099 A | 1/1993 | Lapps et al. |
| 5,181,480 A | 1/1993 | Dabolt |
| 5,394,833 A | 3/1995 | Glass |
| 5,402,751 A | 4/1995 | De La Chevrotiere |
| 5,477,812 A | 12/1995 | Waters |
| 5,507,252 A | 4/1996 | Ebert |
| 5,509,379 A | 4/1996 | Hoeschen |
| 5,544,620 A | 8/1996 | Sarkissian |
| 5,551,375 A * | 9/1996 | Flores .................. 119/166 |
| 5,622,140 A * | 4/1997 | McIlnay-Moe ............ 119/166 |
| 5,636,593 A | 6/1997 | Vito |
| 5,662,066 A | 9/1997 | Reitz |
| 5,713,302 A | 2/1998 | Walter |
| 5,752,465 A | 5/1998 | Page |
| 5,823,137 A * | 10/1998 | Rood et al. .............. 119/166 |
| 6,055,935 A | 5/2000 | Engel |
| 6,126,015 A * | 10/2000 | Haymaker .............. 119/166 |
| 6,286,457 B1 | 9/2001 | Sugahara |
| 6,463,881 B1 | 10/2002 | Reitz |
| 6,742,476 B1 * | 6/2004 | Sage, Jr. ................ 119/166 |

* cited by examiner

*Primary Examiner*—Teri Pham Luu
*Assistant Examiner*—Elizabeth Shaw
(74) *Attorney, Agent, or Firm*—Klarquist Sparkman, LLP

(57) ABSTRACT

A cat litter device includes a drum rotatable about an axis for containing litter with the drum having a front and a backend. A cat opening is disposed in the front end and a waste exit is disposed in the backend, which is coaxial with the rotation axis. A filter is fixed for rotation within the drum between the front and back ends for sifting feces and agglomerated filter from the litter. The filter conforms to a drum interior to prevent breakup of fragile agglomerates. An exterior waste tube is in communication with the filter and the waste exit for receiving feces and agglomerated litter from the filter and transferring the feces and agglomerated litter to the waste exit. An exterior waste tube is coupled to the waste exit for enabling rotation of the drum thereabout and a collection bag is removably connected to the exterior waste tube for receiving and disposing of the feces and agglomerated litter.

20 Claims, 4 Drawing Sheets

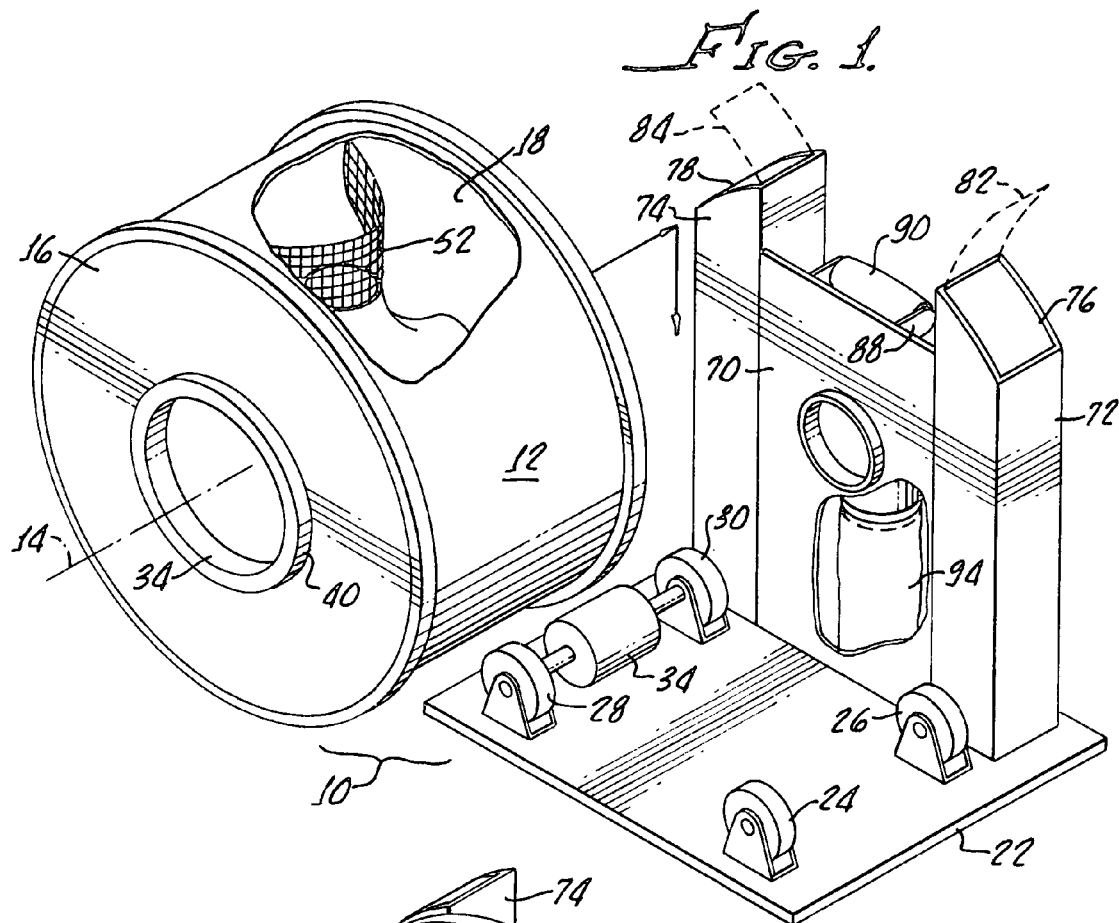
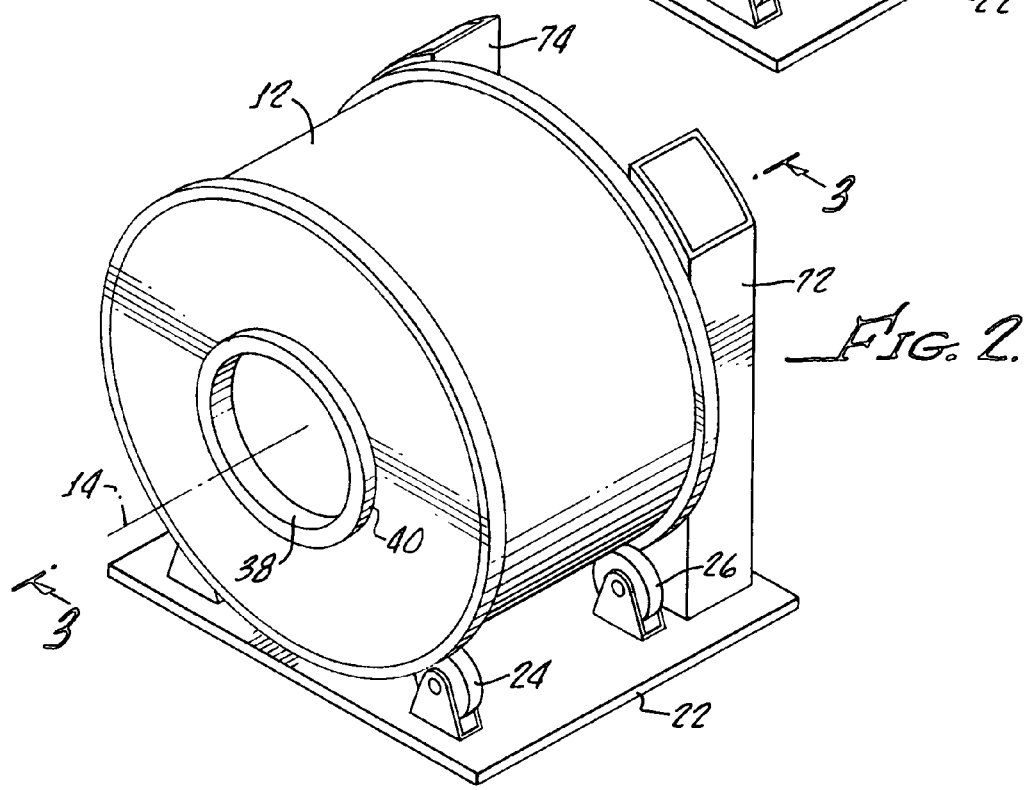

CAT LITTER DEVICE

The present invention is generally directed to litter devices for domestic pets, particularly cats, and more directly pertaining to an automated cat litter device for the separation and disposal of feces and agglomerated litter.

Heretofore, many common cat litters have utilized a box containing sand or the like. These conventional commercial cat litter boxes typically have upright sidewalls and upright enwalls to prevent litter from being scattered outside the box.

To dispose of the fecal matter and agglomerated litter, typically caused by urine, the boxes are either emptied manually by inversion or through the use of a slotted scoop or the like.

Obviously, such cleaning and changing of litter causes human exposure thereto, which may be particularly offensive to many cat owners. While disposable cat litter material is commercially available, which is scented to mask the unpleasant odors of the body wastes, they are often not effective. In addition, such scented cat litters can only be used for a limited period of time before the odors in the vicinity of the cat litter box become offensive. The buildup of odor often cause by the ineffective removal of litter agglomerates. Such agglomerates are coalesced by cat urine and may be very fragile. Thus, a common scoop tends to break up the agglomerates which then remain in the liter as urine soaked particulates.

Many self-cleaning litter boxes have been developed in an attempt to avoid the hereinabove noted limitations of prior art. For example, U.S. Pat. No. 6,463,881 provides for a litter device with a rotatable chamber having a weighted liner, waste portals and electronic controls. However, this device cause fragmentation of agglomerates, has an awkward waste bin, causing possible handling of waste and provides no storage for clean litter.

U.S. Pat. No. 6,286,457 provides for a self-cleaning litter box with a rotating drum with a spiral filter and a means for introducing clean litter. This device also causes agglomerate fragmentation.

The present invention provides for a cat litter device which enables a separation of feces and agglomerated litter from unused litter and provides for dispose thereof without the possibility of contact therewith. The mechanism provided for gentle handling of agglomerates to limit the fracturing thereof. In addition, the device provides for the storage of clean litter and disposable litterbags.

SUMMARY OF THE INVENTION

A cat litter device in accordance with the present invention generally includes a drum rotatable about an axis for containing litter. The drum includes a front end and a back end with a cat opening disposed in the front end and a waste exit disposed in the back end. The waste exit is coaxial with the rotation axis.

A filter is provided and fixed for rotation within the drum between the front and back ends for sifting feces and agglomerated litter from the litter in a manner limiting agglomerate fracture as hereinafter described.

An interior waste tube is provided and in communication with the filter and the waste exit for receiving feces and agglomerated litter from the filter and transferring the feces and agglomerated litter to the waste exit. The waste tube is fixed within the drum for rotation therewith and the drum rotation effects sifting, or filtering, of the litter by the filter which may comprise a mesh.

An exterior waste tube is coupled with the waste exit for enabling rotation of the drum thereabout and a collection bag is removably connected to the exterior waste tube for receiving and disposing the feces and agglomerated litter. Accordingly, the feces and agglomerated litter are delivered to the collection bag exterior to the drum and in a position for removal from the device and into the bag without human contact therewith.

Preferably, the device includes a base for rotatably supporting the drum and a back plate may be provided and fixed to the base for preventing rotation of the exterior waste tube and also provides support for storage of clean collection bags.

In addition, the device in accordance with the present invention may include at least one canister disposed on the base proximate the exterior waste exit for storing of clean litter. Accordingly, the device in accordance with the present invention provides for an all-in-one portable self-cleaning sanitary station for cats.

More particularly, the exterior main waste tube may have an elbow shape and the filter may include a base portion conforming to an inside curb surface of the drum.

An upstanding portion of the filter proximate the front end of the drum prevents and guides a litter away from the cat opening upon drum rotation.

To further reduce odor an odor barrier may be disposed between the collection bag and the exterior waste tube.

Finally, a removable plug may be provided and disposed in the drum back for enabling removable of litter from the drum.

BRIEF DESCRIPTION OF THE DRAWINGS

The advantages and features of the present invention will be better understood by the following description when considered in conjunction with the accompanying drawings in which:

FIG. 1 is a perspective exploded view of a cat litter device in accordance with the present invention generally showing a drum rotatable about an axis for containing litter and partially broken away to show a filter and waste exit along with an interior waste tube, a base, backplate, an exterior waste tube, collection bag and canisters for storage of clean litter;

FIG. 2 is a perspective view of the cat litter device shown in FIG. 1 in an assembled configuration;

DETAILED DESCRIPTION

Figure 3:
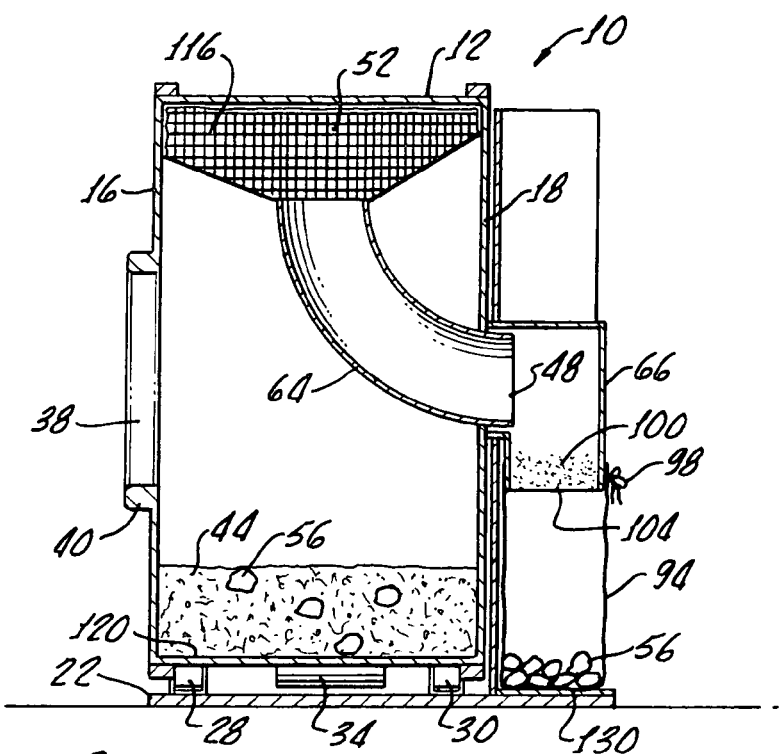
FIG. 3 is a cross sectional view taken along the line 3—3 of FIG. 2 more particularly showing the filter, interior waste tube, and collection bag.

With reference to FIGS. 1 and 2, there is shown a cat litter device 10 in accordance with the present invention showing a drum 12 rotatable about an axis 14 including a front end 16 and a back end 18.

The drum 12 may be formed from a single piece of suitable material such as plastic, or the like, or be assembled with drum segments, not shown, which may be attached to form the drum 12, this configuration providing breakdown for shipment of the device 10.

A base 22 includes rollers 24, 26, 28, 30 for both supporting the drum 12 and rotating the drum through the use of an electric motor 34 coupled to rollers 28, 30. Rotation of the drum 12 may be manually controlled or circuitry, not shown, 34 may be provided for controlling timed rotation of the drum 12. Such control may be effected through a wireless remote control or a manual switches (not shown) disposed at a suitable location on the device. As hereinafter noted, the drum rotation may also be controlled by sensing devices, not shown, responsive to cat movement, time or odor.

A cat opening 38 is provided in the front end 16 of the drum 12 which may include a shroud 34 thereabout for preventing litter 44 spillage during operation of the device 10, see FIGS. 3–8. A waste exit 48 is disposed in a backend 18 which is coaxial with the rotation axis 14, thus facilitating removal of feces and agglomerated litter independent of drum 12 rotation.

A filter 52 which is preferably a ¼ inch coated mesh wire is fixed for rotation within the drum 12 between the front end 16 and back end 18 for sifting feces and agglomerated litter 56 from the litter 44 upon rotation of the drum 12, as hereinafter described in greater detail.

The filter 52 extends approximately ¼ of the circumference of the drum 12 and includes at least one upstanding end 60 which may be about 4 inches in height when utilizing a cat opening 38 having a diameter between about 9 and 11 inches.

An interior waste tube is in communication with the filter 52 and the waste exit 48 for receiving feces and agglomerated litter 56 from the filter 52 and transferring the feces and agglomerated litter 56 to the waste exit 48. As shown, the interior waste tube 64 is fixed within the drum 12 for rotation therewith along with the filter 12.

The interior waste tube communicates with an exterior waste tube 66, which is preferably L, or elbow shaped, and is coupled to the waste exit for enabling rotation of the drum 12 thereabout.

As most clearly shown in FIG. 1, a removable backplate, or upstanding panel, 70 is provided for supporting the waste exit 48 and exterior waste tube 66, which prevents rotation of the exterior waste tube.

Removable clean litter containers, or canisters, 74 are provided for storage of clean litter and include arcuate tops 76, 78 which conform to the overall profile of the drum and also may include hinged covers 82, 84 for preventing inadvertent access to the container 72, 74.

Referring again to FIG. 1, a bracket 88 attached to the upstanding panel 70 between the canisters 70, 74 provides apparatus for storage of a roll of collection bags 94.

Figure 5:
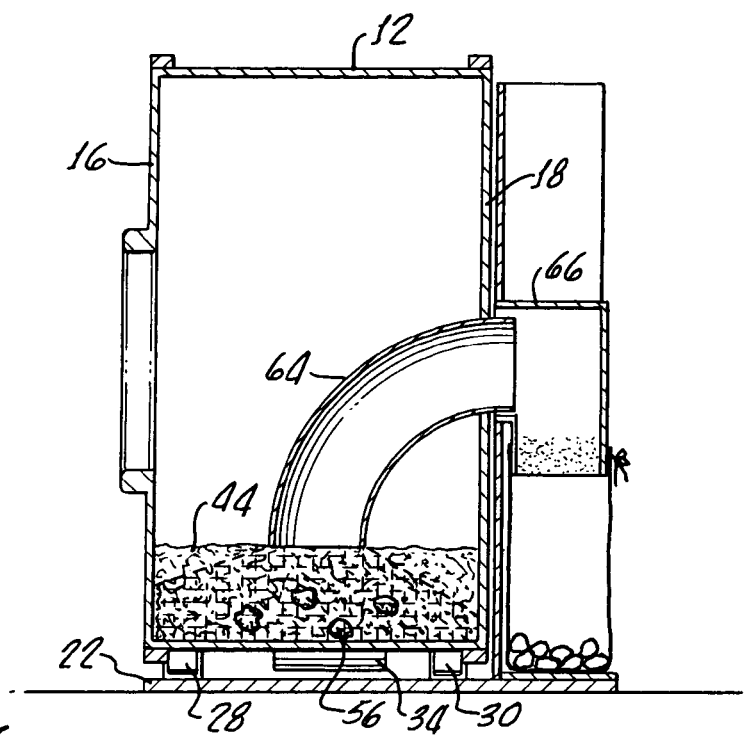
FIG. 5 is a cross-sectional view similar to that shown in FIG. 3 with the drum rotated in order that the filter passes through the cat litter for separation of feces and agglomerated cat litter in a smooth manner.

As best shown in FIGS. 1, 3 and 5, the collection bag 94 may be removably attached to the exterior waste tube 62 in any conventional manner such as by, for example, rubber band, tie strip, embedded elastic band or tie strings 98, the latter enabling removal of the bag and closure of the top thereof without contact with feces and agglomerated litter 56 deposited therein.

In order to further reduce odor, an odor barrier 100 may be disposed in an exit 104 of the exterior waste tube 160 and consists of any suitable material and configuration for enabling uninhibited passage of feces and agglomerated litter 56 passing through the exterior exhaust tubes 62 and into the collection bag 94 while reducing odors concomitant with cat feces and urine.

Over a long period of time, the litter 44 may be exchanged within the drum by simply inverting the drum to pour the litter through the cat opening 33. Alternatively, a plug 108 may be provided in the back end 18 of the drum 12, see FIG. 4.

Figure 4:
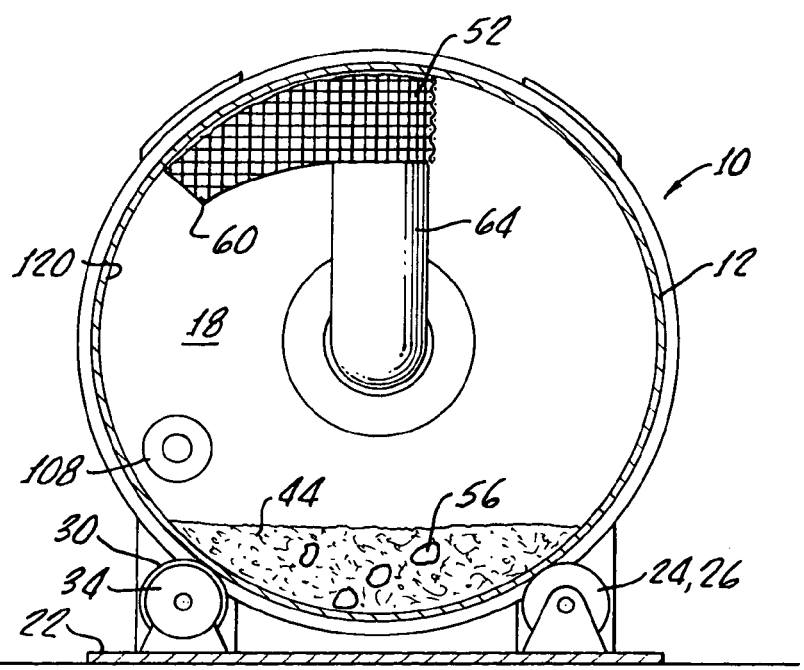
FIG. 4 is taken along the line 4—4 of FIG. 2 generally showing the position of the filter within the drum before rotation for separation of feces and agglomerated cat litter.
Figure 6:
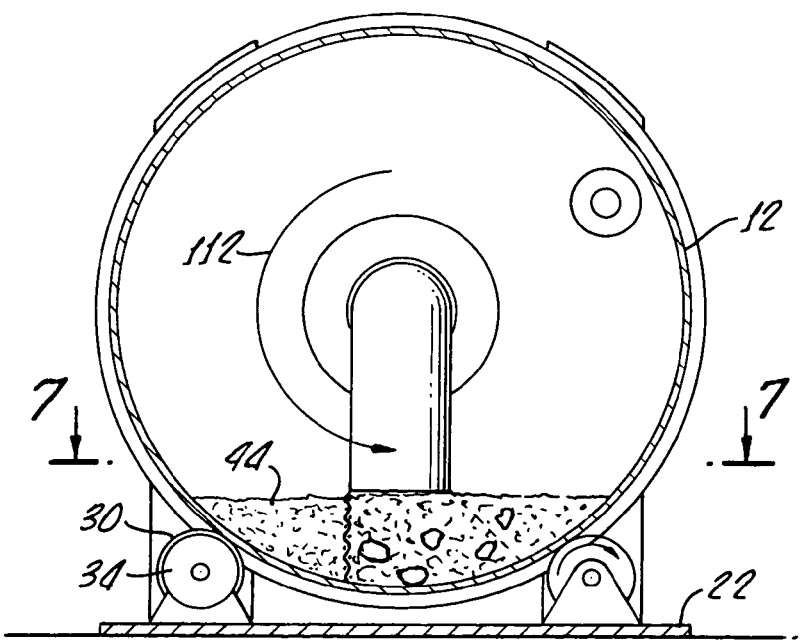
FIG. 6 is a cross sectional view similar to that shown in FIG. 4 showing the filter sifting through the cat litter at the base of the drum.

Operation of the device 10 is illustrated in FIGS. 4–8, which illustrate rotation of the drum from a position in which the filter 52 is above the litter 44 shown in FIG. 4 and by rotation indicated by the arrow 112 in FIG. 6. The filter 52 passes through the litter 44 sifting feces and agglomerated litter 56 from the litter 44. The mesh of 116 of the filter 52 prevents passage of the feces and agglomerated litter 56 therepast and thereafter lifts the feces and agglomerated litter 56. As most clearly shown in FIG. 8, as the filter 52 is returned to its original position by rotation of the drum 12.

Gravity and the shape of the filter 52 enables the feces and agglomerated litter 56 to fall downwardly toward the central released exit 48 through the interior waste tube 64, exterior waste tube 66 and into the collection bag 94.

The overall shape of the filter 52 enables this result without the use of any spiraled or contorted filter shape wherein may cause break up of fragile agglomerates 56.

Figure 7:
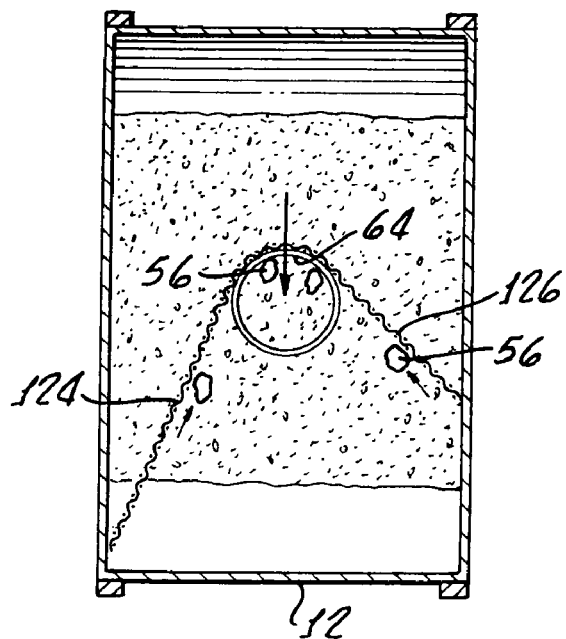
FIG. 7 is a cross sectional view taken along the line 7—7 of FIG. 5 generally showing a plan view of the filter within the drum.
Figure 8:
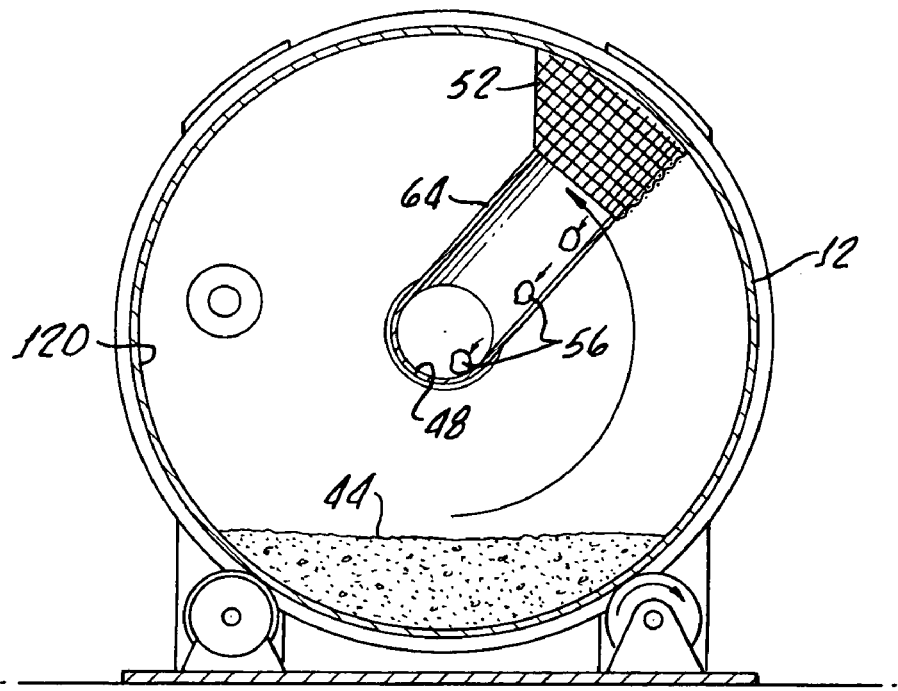
FIG. 8 is a cross sectional view similar to FIGS. 4 and 6 showing continued rotation of the filter and interior waste tube for enabling gravity to pass the feces and agglomerated litter, sifted from the litter through the interior waste tube and through the coaxial waste exit.

As shown in FIG. 7, the general contour of the filter coincides with the inside drum surface 120. This parallel relationship reduces drag on the feces and agglomerated litter 56 in order to maintain smooth litter flow at each point where the filter mesh 116 passes through the litter 44. This also significantly reduces dust generation.

This gentle sifting is important in that relatively loose agglomerates 56 are not broken up and remain in the litter 44 but are generally transported to the inner waste tube 64. Thereafter, tumbling action may break up the loose agglomerates. However, at that point they are destined for the collection bag.

As a result, less urine impregnated litter resides in the drum, thereby providing longer lasting litter 44 charges and less frequent litter 44 replacement.

Further, sidewalls 124, 126 contain and divert the feces and the agglomerated litter 56 toward the waste exit 48 through the interior waste tubes 64.

It should be appreciated that all the components including the filter 52, interior waste tube 64, exterior waste tube 66 and collection bags 94 are all replaceable, separately removable and washable. Accordingly, the simplicity of design in the present invention provides for easy maintenance thereof while at the same time maintaining clean litter and interior drum surfaces.

In addition, as hereinabove noted, electronics, not shown, and sensors, not shown, may enable timed and/or responsive system for drum rotation. In addition, sensors 130 suitably disposed, as illustrated in FIG. 3, may be provided for providing an indication of a full collection bag 94, which may include a light or audio signal in order to provide prompting for the pet owner to tend to the cat litter device 10 by bag 94 replacement.

Although there has been hereinabove described a specific cat drum litter device in accordance with the present invention for the purpose of illustrating the manner in which the invention may be used to advantage, it should be appreciated that the invention is not limited thereto. That is, the present invention may suitably comprise, consist of, or consist essentially of the recited elements. Further, the invention illustratively disclosed herein suitably may be practiced in the absence of any element, which is not specifically disclosed herein. Accordingly, any and all modifications, variations or equivalent arrangements that may occur to those skilled in the art, should be considered to be within the scope of the present invention as defined in the appended claims.

What is claimed is:

1. A cat litter device comprising:
   a drum rotatable about an axis for containing litter, said drum having a front end and a back end;
   a cat opening disposed in the front end;
   a waste exit disposed in the back end and coaxial with the rotation axis;
   a filter, fixed for rotation with said drum between the front and back ends, for sifting feces and agglomerated litter from the litter;
   an interior waste tube, in communication with said filter and said waste exit, for receiving feces and agglomerated litter from said filter and transferring the feces and agglomerated litter to said waste exit, said interior waste tube being fixed within said drum for rotation therewith;
   an exterior waste tube coupled to said waste exit for allowing rotation of said drum thereabout; and
   a collection bag removably connected to said exterior waste tube for receiving and disposing of the feces and agglomerated litter.

2. The cat litter device according to claim 1 further comprising a base for rotatably supporting said drum.

3. The cat litter device according to claim 2 further comprising a backplate fixed to said base for preventing rotation of said exterior waste tube.

4. The cat litter device according to claim 3 further comprising at least one canister disposed on said base proximate said exterior waste exit for storing of clean litter.

5. The cat litter device according to claim 4 wherein said exterior waste tube has an elbow shape.

6. The cat litter device according to claim 5 further comprising apparatus, disposed on said backplate over said exterior waste like for storage of clean collection bags.

7. The cat litter device according to claim 1 wherein said filter comprises a mesh.

8. The cat litter device according to claim 7 wherein said filter comprises a base portion conforming to an inside curved surface of said drum.

9. The cat litter device according to claim 8 wherein said filter further comprises upstanding portion proximate the front end of said drum.

10. The cat litter device according to claim 1 further comprises a odor barrier disposed between said collection bag and said exterior waste tube.

11. The cat litter device according to claim 1 further comprising a removable plug disposed in the drum back end for enabling removal of litter from said drum.

12. A cat litter device comprising:
    a base;
    a drum, supported by said base for rotatable about an axis for containing litter, said drum having a front end and a back end;
    a cat opening disposed in the front end;
    a waste exit disposed in the back end and coaxial with the rotation axis;
    a filter, fixed for rotation with said drum between the front and back ends, for sifting feces and agglomerated litter from the litter;
    an interior waste tube in communication with said filter and said waste exit for receiving feces and agglomerated litter from said filter and transferring the feces and agglomerated litter to said waste exit, said interior waste tube being fixed within said drum for rotation therewith;
    an exterior waste tube coupled to said waste exit for allowing rotation of said drum thereabout; and
    a collection bag removably connected to said exterior waste tube for receiving and disposing of the feces and agglomerated litter.

13. The cat litter device according to claim 12 further comprising a backplate fixed to said base for preventing rotation of said exterior waste tube.

14. The cat litter device according to claim 13 further comprising at least one canister disposed on said base proximate said exterior waste exit for storing of clean litter.

15. The cat litter device according to claim 14 wherein said exterior waste tube has an elbow shape.

16. The cat litter device according to claim 15 further comprising apparatus, disposed on said backplate over said exterior waste like for storage of clean collection bags.

17. The cat litter device according to claim 12 wherein said filter comprises a mesh.

18. The cat litter device according to claim 17 wherein said filter conforms to an inside curved surface of said drum in order to effect gentle removal of fragile agglomerates from the litter.

19. The cat litter device according to claim 18 wherein said filter further comprises upstanding portion proximate the front end of said drum.

20. The cat litter device according to claim 12 further comprises a odor barrier disposed between said collection bag and said exterior waste tube.

* * * * *